Patented Jan. 15, 1952

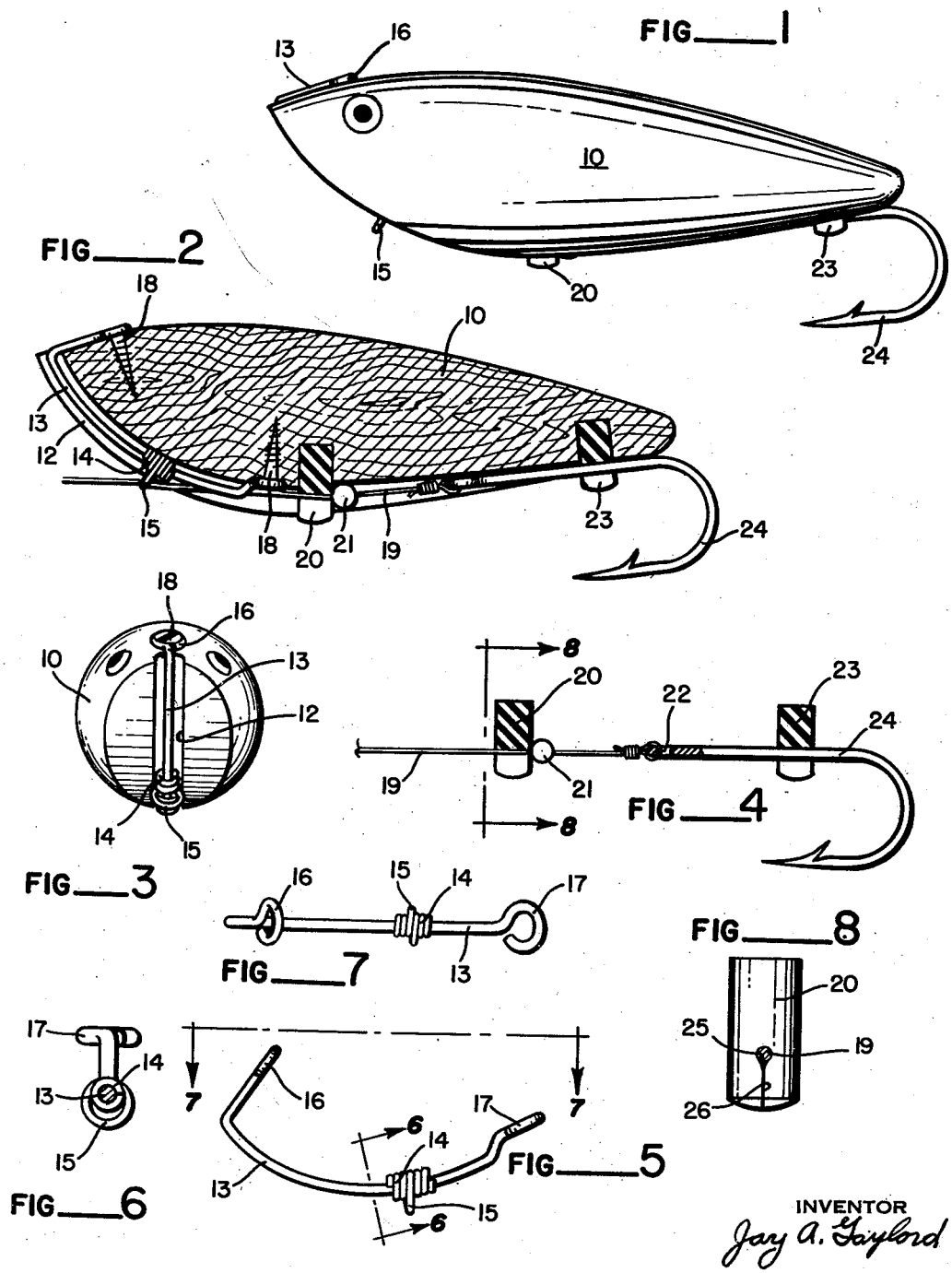

2,582,627

UNITED STATES PATENT OFFICE 2,582,627

FISH LURE

Jay A. Gaylord, Seattle, Wash.

Application March 24, 1950, Serial No. 151,738

3 Claims. (Cl. 43—42.05)

1

The invention relates to improvements in fish lures, and more particularly to a fish lure which is shiftable on the line attached thereto, upon a strike made by a fish.

An object of the invention is to provide an improved fish lure whose body is longitudinally grooved along its bottom surface for receiving a suitable line guiding means.

Another object of the invention is to provide an improved fish lure whose body is longitudinally grooved to receive a line guiding means, a line holding clip, and a hook holding clip.

A further object of the invention is to provide an improved fish lure which is shiftable on a line attached thereto, and which will be highly efficient in operation and relatively inexpensive to manufacture.

Other objects will appear as the description proceeds.

In the accompanying drawings which form a part of this application,

Figure 1 is a side elevation of the improved fish lure;

Figure 2 is a longitudinal sectional view through the fish lure;

Figure 3 is a front view of the fish lure;

Figure 4 is a view partly in section of the hook assembly, showing the line holding clip, the line stop and line, and the hook holding clip and hook;

Figure 5 is a side elevation of the guide bar with line guide slidably mounted thereon;

Figure 6 is a sectional view taken on the line 6—6 of Figure 5;

Figure 7 is a top plan view of the guide bar and slidable line guide shown in Figure 5, and Figure 8 is a front elevation of the line holding clip with the line shown in section received therein.

Like characters of reference are used throughout the following specification and drawings to designate corresponding parts.

The lure body 10 is shaped to simulate a fish and is curved downwardly and rearwardly at its forward end. A longitudinally extending groove 12 is formed in the bottom of the lure body 10 from its front end to a point adjacent its rear end. An arcuate guide bar 13 is disposed in the forward end of the slot 12 in spaced relation to the bottom of said slot, and is formed on its forward end with an angularly bent portion terminating in an eye 16, which bent portion and eye will overlie the top forward end of the lure body 10. The rear end of the guide bar 13 is bent inwardly and terminates in the eye 17 which con-

2 tacts the bottom of the slot 12 in the lure body 10. Screws 18 will extend through the eyes 16 and 17 to hold the guide bar in position in the slot 12 in the lure body 10. A coiled line guide 14 is slidably disposed on the guide bar 13 and has a loop extended outwardly therefrom to provide a line guide eye 15 for slidably receiving the fishing line 19.

A slotted line holding clip 20 is suitably secured in the groove slightly spaced rearwardly from the eye 17 of the guide bar, and is adapted to hold the fishing line 19 in its longitudinally extending slot. A stop in the form of a ball 21 is fixed upon the line 19, and is adapted to abut the line holding clip 20 at the rear end of the slot formed therein. The eye 22 of a fish hook 24 is secured to the end of the line 19, and the shank of the hook is adapted to be received in a longitudinally extending slot in the hook holding clip 23 disposed in the slot 12 adjacent the rear end of the lure body 10. It will be understood that the slots in the line holding clip 20 and hook holding clip 23 will be longitudinally aligned.

In operation the line 19 and fish hook 24 will be disposed in the slots in the line holding clip 20 and hook holding clip 23 with the spherical stop 21 in contact with the rear surface of the line holding clip 20. Upon the strike of a fish, the hook 24 will be pulled from the hook holding clip 23 and as the fish is "played," the stop 21 will be moved from contact with the line holding clip 20, and the line 19 pulled free of the slot in said clip 20, whereupon the lure body will slide up the line away from the fish. The line guide 14 may be disposed at various points along the line guide bar 13 to effect different positions of the lure body as it is pulled through the water.

The lure body 10 may be painted in any desired color scheme.

Many minor changes in detail of construction may be resorted to without departure from the spirit of the invention.

I claim:

1. A fish lure having a body provided with a downwardly and rearwardly curved forward end, a guide bar secured at its upper and lower ends to the top and bottom portions of said body, and a line guide slidably mounted on said guide bar.

2. A fish lure having a body, a guide bar on said body, and line guide slidably mounted on said guide bar, a line clip on said lure body adjacent said guide bar, a hook clip on said lure body spaced from said line clip, a fish line slidably disposed through said line guide, a stop fixed to said line rearwardly of said line guide, and a hook secured to the end of said line.

3. A fish lure comprising a body having a longitudinally extending slot in the bottom thereof, a guide bar secured at its upper and lower ends to the top and bottom portions of the body with an intermediate portion of said guide bar disposed in said slot in spaced relation to said body, a line guide slidably mounted on the bar, a line holding clip secured to the body rearwardly of the bar, a hook holding clip secured to the body adjacent the rear end of the body, a line passing through said line guide and releasably held by said line holding clip, a stop fixed on said line engageable with the rear of said line holding clip, and a hook secured to the end of said line rearwardly of said stop releasably maintained adjacent the body in said hook holding clip, whereby upon the strike of a fish, the hook, stop and line will be freed from said clips and said lure body will be free to slide away from said hook.

JAY A. GAYLORD.

REFERENCES CITED

The following references are of record in the file of this patent:

UNITED STATES PATENTS

| Number | Name | Date |
| --- | --- | --- |
| 1,239,956 | Phinney | Sept. 11, 1917 |
| 1,733,777 | Comstock | Oct. 29, 1929 |
| 1,744,366 | Davenport | Jan. 21, 1930 |
| 2,172,889 | Niemi | Sept. 12, 1939 |
| 2,189,958 | Middlemiss | Feb. 13, 1940 |
| 2,225,676 | White | Dec. 24, 1949 |
| 2,517,299 | Gaylord | Aug. 1, 1950 |